INVENTOR:
HOMER J. SHAFER

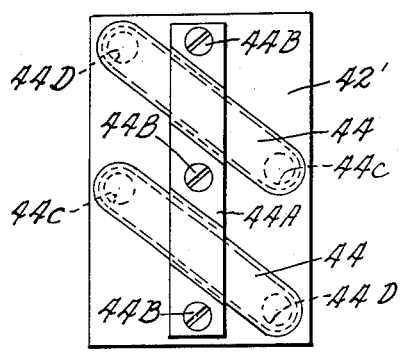
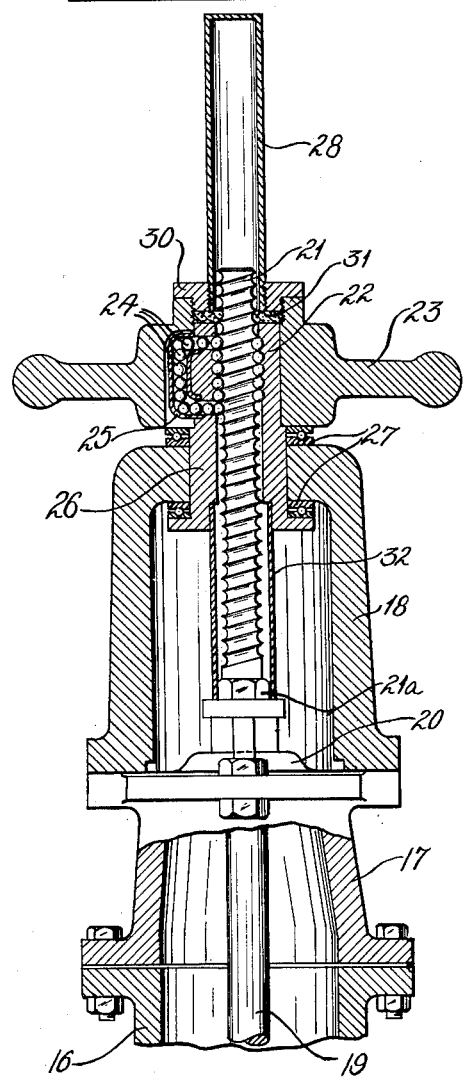
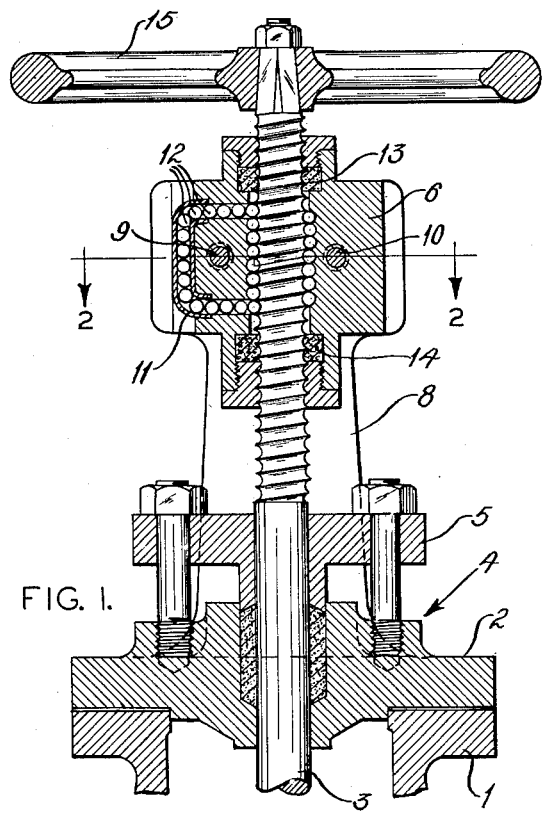
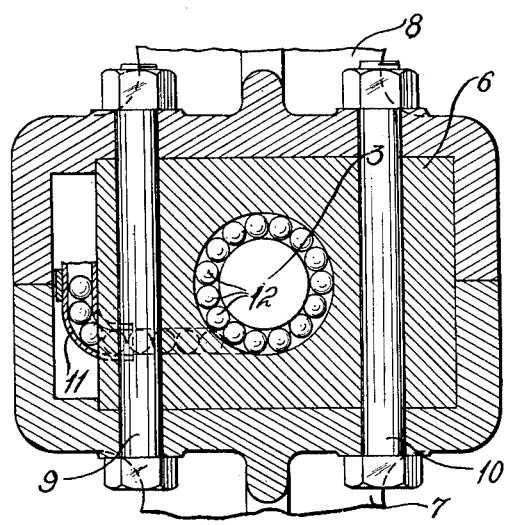
FIG. 4a
FIG. 1.
FIG. 3.
FIG. 2.
INVENTOR:
HOMER J. SHAFER
BY Alfred F. Rees
ATTORNEY.

INVENTOR:
HOMER J. SHAFER
BY Alfred F. Rees
ATTORNEY.

INVENTOR:
HOMER J. SHAFER

BY Alfred F. Dees

ATTORNEY.

United States Patent Office 2,738,684
Patented Mar. 20, 1956

2,738,684

OPERATING MECHANISM FOR HIGH PRESSURE VALVES

Homer J. Shafer, Mansfield, Ohio, assignor to Mansfield Development, Inc., Mansfield, Ohio, a corporation of Ohio Application October 21, 1949, Serial No. 122,817

4 Claims. (Cl. 74—424.8)

This invention relates to valve operating mechanisms and in its more specific aspects is directed to a device for materially reducing friction losses in the mechanism that operates the movable element of the valve.

One of the objects of the invention is to produce a mechanism for operating the movable element of a valve so that only a small expenditure of energy will be required for opening and closing the valve.

Another object of the invention is to provide a mechanism having a low friction characteristic or an anti-friction member for operating the movable element of a valve.

Another object of the invention is to provide means in a valve operating element for preventing auto-rotation of the valve stem.

Another object of the invention is to provide means on a ball bearing mounted valve stem which includes a device for preventing undesired rotation of the valve stem.

The invention consists in the provision of a valve having a stem provided with an anti-friction bearing raceway which passes through a nut having an anti-friction bearing raceway therein between which raceways a series of anti-friction members are disposed. The invention also consists in the provision of a means supported on the valve cooperating with the valve stem for the purpose of preventing undesired auto-rotation of the stem and for regulating the speed of rotation of the stem while the valve is being opened.

In the drawings:

Fig. 1 is an elevational view of a valve stem operating mechanism;

Fig. 2 is a sectional view taken along the line 2—2 of Fig. 1;

Fig. 3 is a view similar to Fig. 1 showing a modified form of the invention;

Fig. 4a is an enlarged plan view of the raceway assembly for anti-friction elements;

Figure 4:
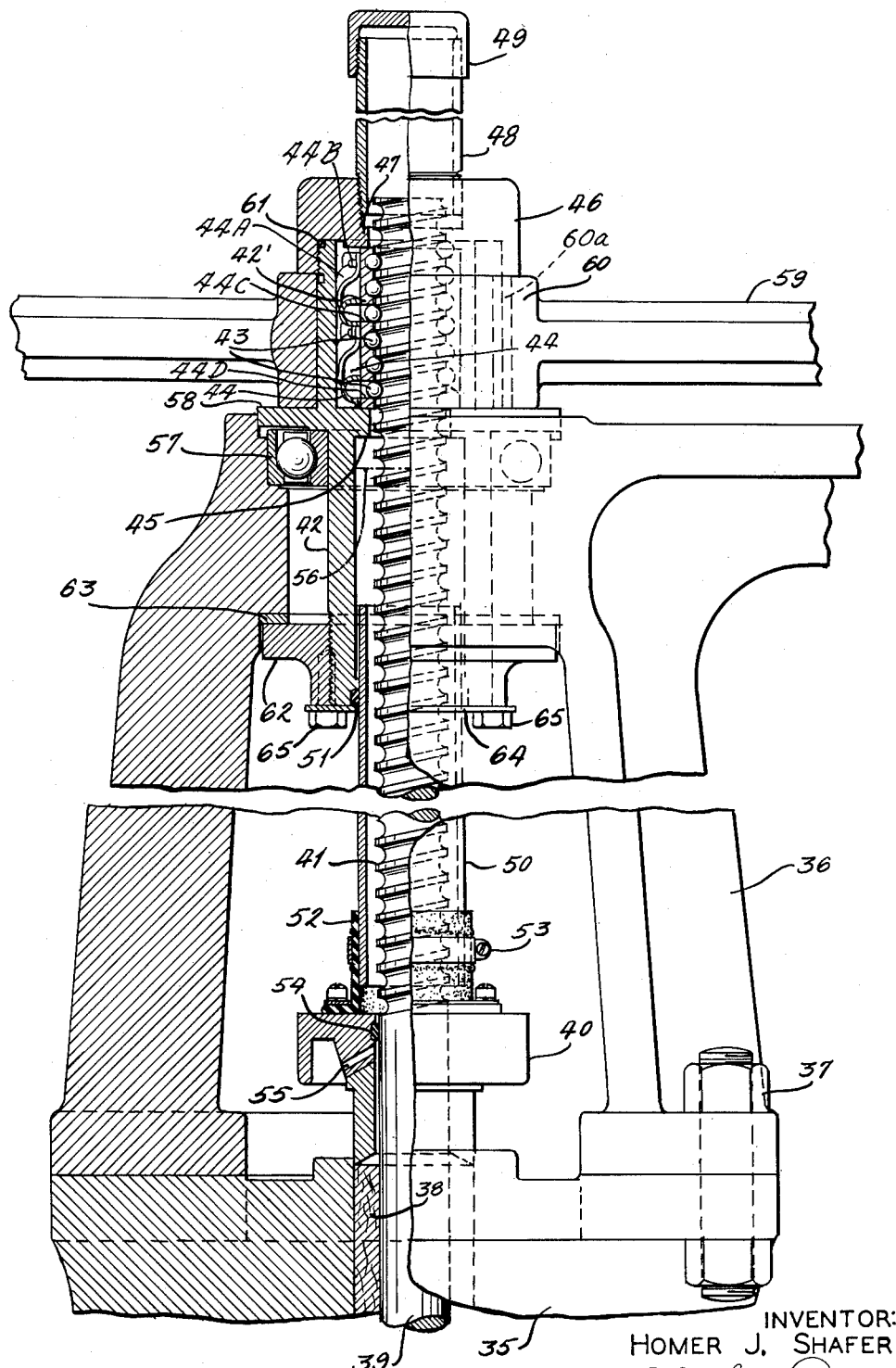
Fig. 4 is a vertical section view of a valve incorporating means for preventing undesired valve stem auto-rotation.

This application is a continuation-in-part of Patent No. 2,630,829, issued March 10, 1953, and entitled Valve Operating Mechanism.

One embodiment of the invention is shown in Figs. 1 and 2 of the drawings in which 1 designates a portion of a valve body to which a cover 2 is suitably secured. A valve actuating rod or stem 3 projects through an aperture in the cover 2 and leakage is prevented between the rod 2 and the walls of the aperture by means of a suitable stuffing box which includes an element 5 for compressing a packing material arranged in the stuffing box.

The upper end of the rod 3 is provided with a screw thread which constitutes one raceway for a series of balls or other anti-friction elements 12 and the cooperating raceway is formed in a nut 6. Nut 6 is held in separable standards 7 and 8 each of which at one end thereof is suitably secured to the cover 2. Bolts 9 and 10 clamp the other ends of the standards to the nut 6. A suitably shaped piece of tubing 11 connects the ends of the raceway in the nut for forming a closed path therefor, the raceway for the anti-friction elements 12 extending between the tube ends fixed in the nut, so that a rolling action is obtained between the screw and nut. Each end of the tubing is so constructed that the anti-friction elements 12 are retained in the raceway of the portion of the screw that is positioned in the nut and therefore cannot escape from the raceway at the ends of the nut. Suitable lubricant wipers or retainers 13 and 14 are held in place in the nut 6 so that lubricant may not be lost therefrom as the screw and nut rotate relative to each other.

A hand wheel 15 is secured to the exposed end of the valve rod 3 for rotating it so that the valve mechanism connected to the lower end of the rod may be applied to or removed from a valve seat (not shown) formed in the valve body, the direction of rotation of the rod determining whether the valve is being opened or closed. The amount of labor involved in operating a valve mechanism connected to the rod is materially reduced by reason of the construction illustrated.

A modified form of the invention is disclosed in Fig. 3 of the drawings in which 16 designates the upper portion of a valve body provided with a spacer member 17 that has a cap or closure 18 mounted thereon. The several structural members are suitably assembled into a unitary rigid construction.

A valve actuating rod or stem 19 is axially movable in the valve body along the major axis of the rod in order to withdraw or apply a valve member (not shown) to a valve seat in the valve body. The rod 19 is suitably slidably and rotatably mounted in a bearing 20 formed in the closure 18. An operating rod or screw constructed similarily to the rod 3, shown in Fig. 1, is connected to the rod 19 by means of a suitable connecting member 21a, although rods 19 and 21 may be made in one piece if so desired. The rod 21 cooperates with the nut 22 formed in one end of member 26 to which a suitable handwheel 23 is secured. A series of balls or other anti-friction members 24 is placed in the tubular member 25 that closes the path for the said members, one raceway being formed on the rod 21 and the other being formed in the nut 22. This construction is substantially identical with that shown in Fig. 1 described above.

The member 26 is rotatably supported in cap 18 on a plurality of thrust bearings 27 that are disposed between the cap 18, handwheel 23 and the member 26 as illustrated.

A screw thread or anti-friction member raceway protector 28 is threaded into bushing 30 that is threaded into nut 22. A lubricant wiper may be inserted in the position indicated for assisting in preventing the escape of lubricant from the chamber in nut 22, although the use of a wiper is optional and is not essential. A sleeve 32 for protecting the exposed bearing raceways on the rod 32 below the member 26 is arranged between said member 26 and the bearing 20. The tube or sleeve 32 is preferably filled with a suitable lubricant for the antifriction members and for the bearing 20. The sleeve 32 is interiorly connected with the chamber in the nut 22.

Fig. 4 illustrates a further modification of the invention in which 35 designates a part of a body for a valve on which a yoke 36 is mounted, it being held thereon by suitable securing means 37. A packing gland 38 for a slide bearing (not shown) is provided in body 35 in which a valve stem or rod 39, for a movable valve member, is slidably received. A gland packing collar 40 is disposed about the stem 39 and is fitted and retained in the aperture in which the gland is received.

The upper end of the rod 39 has a helical anti-friction member raceway 41 cut therein and is received in a sleeve 42 rotatably mounted by bearing means 57 in the upper end of the yoke 36. The sleeve 42 has a squared portion securing a square nut 42' therein in the manner shown in Fig. 6, and the nut is provided with a helical anti-friction member raceway that is complemental to the raceway 41. A series of balls or other anti-friction members 43 is disposed between the two raceways and they are held in the nut by a pair of suitable retaining means 44 that function similarly to the piece of tubing 11 shown in Figs. 1 and 2. The sleeve 42 is provided with an abutment 45 that prevents anti-friction members 43 escaping from one end thereof and a cap 46 threaded to the other end of sleeve 42 (as viewed in Fig. 4) is provided with an abutment 47 that prevents the anti-friction members escaping from the other end of the sleeve. Referring to Fig. 4a, the retaining means 44 are affixed to an outer surface of the nut 42' by a clamping strip 44A attached by screws 44B. Midway between the closed path within nut 42', as defined by the abutments 45 and 47, there are provided a pair of holes 44C which provide communication between a point on the raceway, of nut 42' and an end of a member 44. At the outer ends of the closed path within the nut 42', there are provided holes 44D which provide communication between a point adjacent the abutments 45 and 47 and an end of a member 44. Thus the anti-friction means are confined in a closed path so that a rolling action is obtained between the screw and nut.

A sleeve 48 provided with a cap 49 protects the exposed upper end of the spiralled portion of the valve rod or stem 39, the sleeve being threaded into the cap 46 although other modes of securement may be employed. A sleeve 50 is received in the lower end of the sleeve 42 for rotation relative thereto and a seal 51 is disposed between the two for preventing lubricant leakage and entry of grit or foreign matter. The sleeve 50 is also received in a flexible dust shield 52, secured to gland collar 40, with the shield being fastened to the sleeve 50 by a clamp 53. A seal 54 is disposed between the collar and the rod 39 for preventing leakage of lubricant. A suitable lubricant fills the tube to approximately the level indicated. A plurality of ports 55 are cut in collar 40 for permitting the escape of any lubricant that passes seal 54. The tubes 48 and 50 thereby provide complete protection for the raceways.

The sleeve 42 is rotatably supported in the yoke 36 in a radial thrust bearing 57 disposed between a shoulder cut in the yoke 36 and a radial flange or collar 58 on the sleeve. A gear or wheel 59 is provided for rotating the sleeve 42 and has a hub 60 that is disposed between flange 58 and cap 46. A key 60A is disposed between the hub 60 and sleeve 42. A sealing ring 61 is provided between cap 46 and sleeve 42 for preventing the escape of lubricant from the tube 48 onto the gear or wheel 59.

The lower end of the sleeve 42 is externally threaded and a brake drum or disc 62 is threaded thereon. The brake drum is engageable with a friction element 63 secured to a shoulder in yoke 36. The drum 62 is locked in position by a disc 64 secured to the brake drum 62 by screws 65 which also holds seal 51 in position. During certain periods of valve operation the wheel 59 will auto-rotate by reason of the fluid pressure acting on the movable valve member. This action is prevented by the friction between the drum 62 and the friction element 63, the drum being adjusted relative to the friction element by threading it up or down on the sleeve 42.

Figure 5:
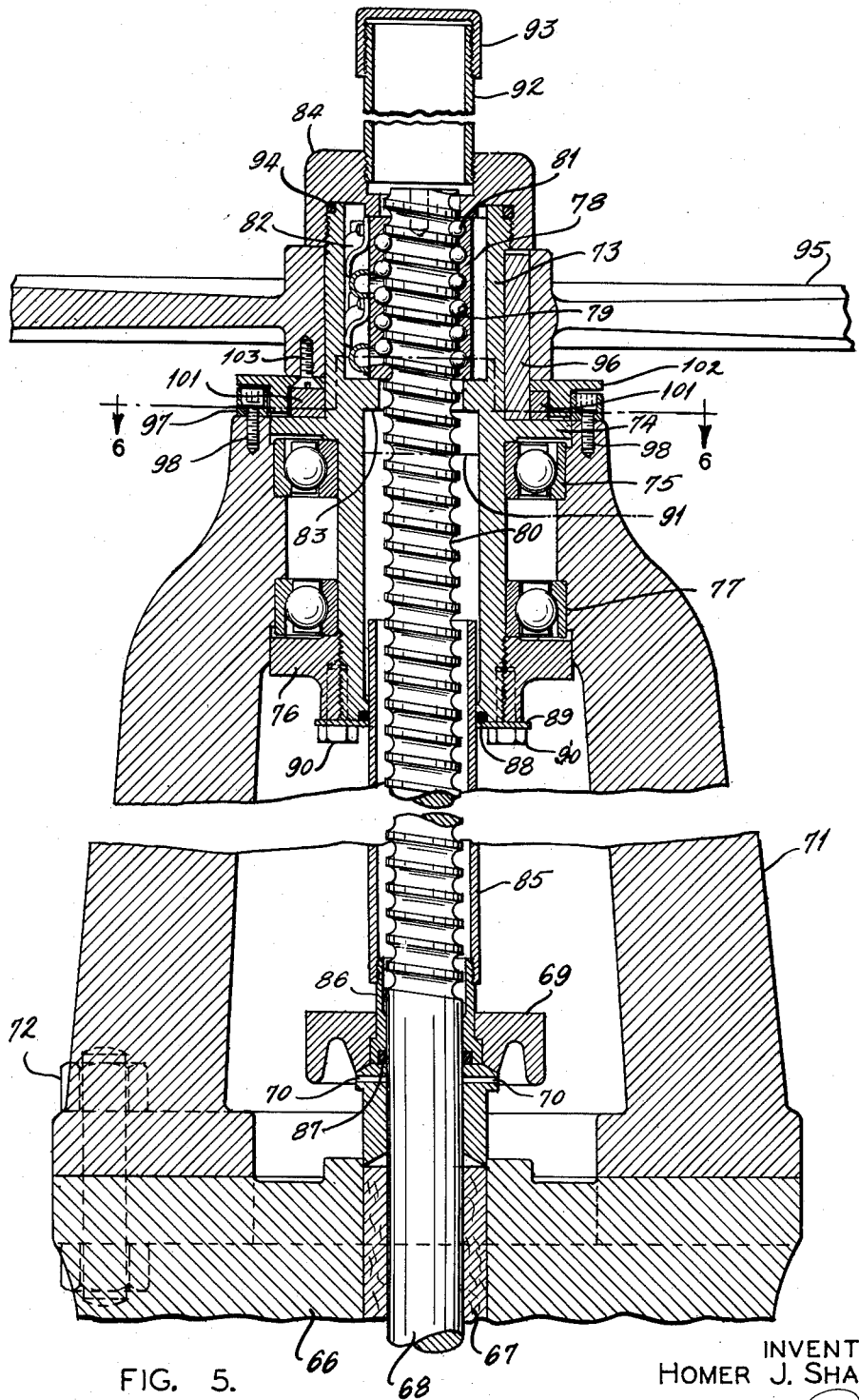
Fig. 5 is a vertical section view showing an improved auto-rotation preventing means.
Figure 6:
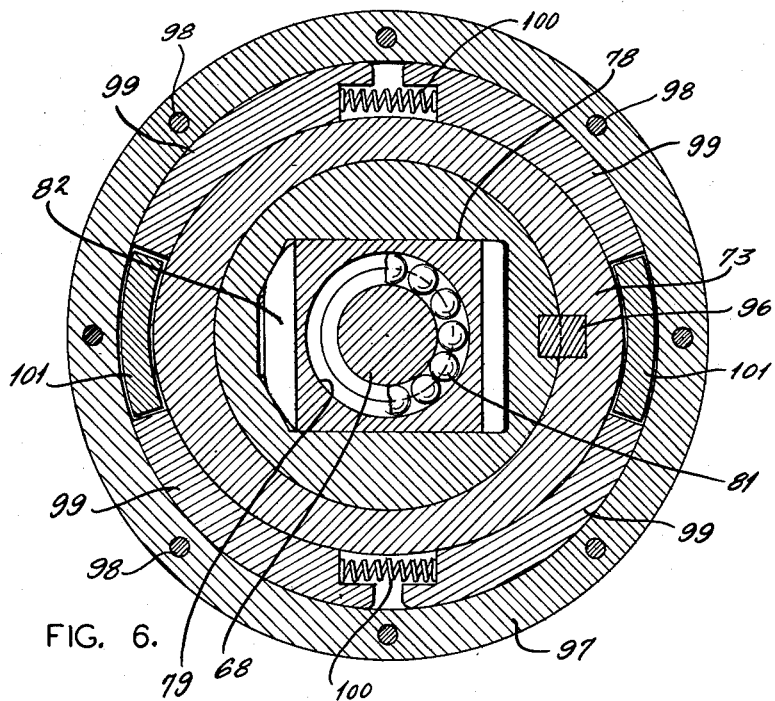
Fig. 6 is a section view taken substantially along the line 6—6 of Fig. 5.

Another modification of the invention is illustrated in Figs. 5 and 6 of the drawings in which 66 designates a part of a valve body having a bore therein in which a gland provided with a stuffing or packing material 67 that surrounds valve rod or stem 68 disposed within the bore. A gland sleeve is disposed about the rod and a follower collar 69 holds the sleeve and stuffing in place as is customary in the art. Suitable vents are provided in the collar 68 whose function will be here-in-after set forth. A movable valve member (not shown) is connected to the rod 68 within the valve body that is engageable with a suitable valve seat for opening and closing the valve.

A yoke 71 is secured to the valve body by fastening means such as screws 72. A sleeve 73 is rotatably supported in the upper end of the yoke and is provided with a radial flange 74 engaging an anti-friction bearing 75. The lower end of the sleeve is threaded and receives a stop nut 76 engaging a second anti-friction bearing 77. The two bearings 75 and 77 abut suitable shoulders in the yoke and the stop nut prevents axial motion of the sleeve 73 in the yoke 71.

The upper end of the bore in the sleeve receives a nut 78 whose bore has helical anti-friction member raceway 79 cut therein and a complemental raceway 80 is formed on the upper end of the rod 68. A plurality of anti-friction members 81 is disposed between the raceways. A closed path for the members is provided within the nut by the suitable retaining means 82, similar in function to the retaining means 44 shown in Figs. 4 and 4a. The anti-friction members are confined to the nut by a flange 83 formed in the sleeve 73 and a cap 84 threaded onto the upper end of the sleeve 73.

Protecting means for the raceways on the rod is provided which comprises a sleeve or tube 85 received in the sleeve 73 and it is threaded to a sleeve 86 received in collar 69. A sealing means 87 is provided between sleeve 86 and rod 68. A sealing means 88 is provided between the sleeves 73 and 85 and held in place by disc 89 clamped to to the end of sleeve 73 by screws 90. A suitable lubricant fills sleeves 76, 85 and 86 to about the level indicated at 91. The vents 70 permit lubricant passing sealing means 87 to escape from the collar 69.

The upper end of the rod 69 is protected by a sleeve 92 threaded into cap 84 and is provided with a closure 93. A sealing means 94 is provided between sleeve 73 and cap 84 for preventing leakage of lubricant. The various sleeves are capable of rotation relative to each other and to the rod 68.

The rod or stem 68 is moved axially relative to sleeves 73, 85 and 92 and to the nut 78 in which it is received. Handwheel 95 is fitted onto sleeve 73 and a key 96 is disposed between them for preventing relative motion although a small amount of lost motion is provided between the two.

Auto-rotation of the handwheel is prevented during the opening of the valve by a braking means comprising a brake drum 97 secured to the yoke 71 by means of a plurality of screws 98. Drum 97 is engageable by brake shoes 99 arranged in pairs, each provided with a suitable brake lining. The shoes are forced into engagement with the drum by springs 100, the shoes anchoring on anchors 101 mounted in cover 102 secured to handwheel 95 by screws 103. The lost motion connection between handwheel and key slot provides for the movement of one of the anchors thereby enabling release of the shoes blocking the intended handwheel movement. The cover prevents damage to and tampering with the operating elements of the brake assembly. Only two of the shoes are effective during a given rotation of the handwheel and brake drum as is well known in the art. The degree of braking is controlled by the spring rate of springs 100. Auto-rotation of the handwheel is thus prevented.

Figure 7:
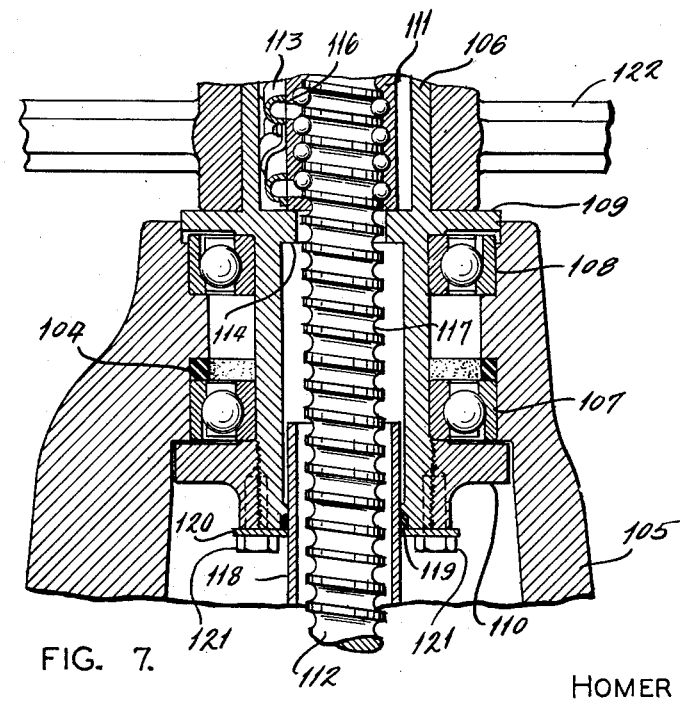
Fig. 7 is a vertical section view of a device similar to that shown in Fig. 4.

A variation of the brake structure shown in Fig. 4 is illustrated in Fig. 7 in which 105 designates the yoke of a valve in which a sleeve 106 is rotatably mounted in anti-friction bearings 107 and 108, the latter engaging a shoulder in yoke 105 and a radial external flange 109 on the sleeve 106. Bearing 107 is engaged by a nut 110 acting as a brake drum secured to a sleeve 106, the nut or drum being adjustably mounted thereon. A resilient element preferably in the form of a rubber ring 104 is disposed between bearing 107 and a shoulder in yoke 105, the resilient element causing the brake drum to yieldably engage a suitabte shoulder in the yoke 105 that may be provided with a brake lining. The shoulder and drum act together as a jam brake for the sleeve 106.

A nut 111 is engaged by an internal flange 114 in the sleeve 106 and a valve rod 112 passes through the nut. The bore of the nut is provided with a helical anti-friction element raceway 116 and the rod is provided with a complemental raceway 117 and anti-friction members 115 are disposed between the two raceways. Retaining members 113 provide a return path for the members 115 between the ends of the nut.

A dust shield 118 is received in the sleeve 106 and a sealing means 119 is disposed between the two, being held in position by disc 120 secured to the nut 110 by screws 121.

Auto-rotation of the handwheel 122 secured to sleeve 106 and of the rod is thus prevented or controlled by the mechanism described thereby bringing the valve under complete control.

Figure 8:
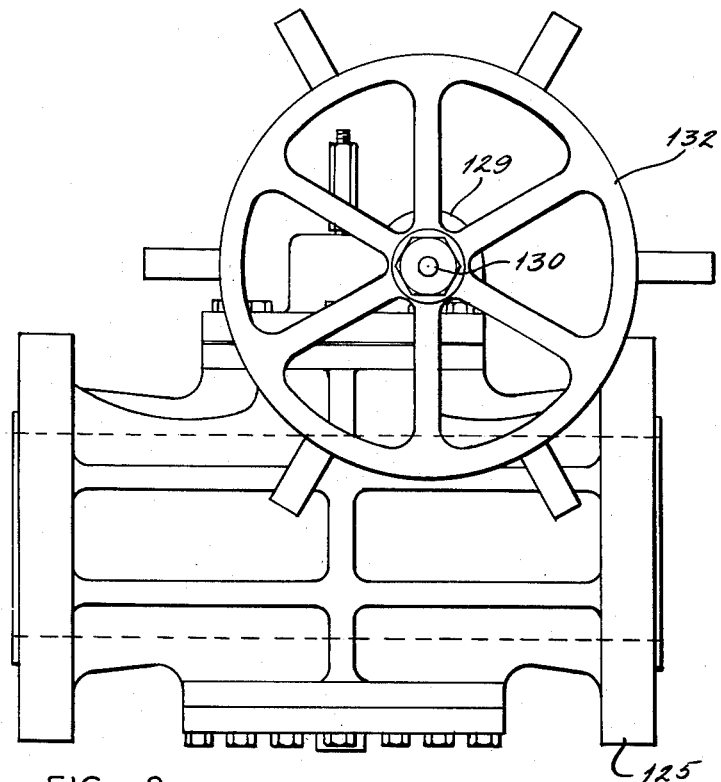
Fig. 8 is a side elevational view of a plug valve embodying the invention.
Figure 9:
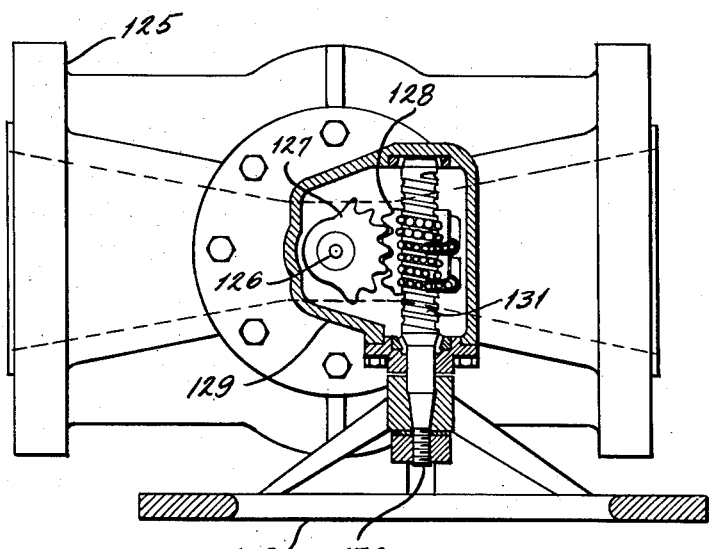
Fig. 9 is a plan view of the valve shown in Fig. 8 with parts broken away to show detail.

The anti-friction member drive is shown applied to a plug type valve illustrated in Figs. 8 and 9 in which 125 designates a valve body for a plug valve rotatably mounted therein whose upwardly extended shaft 126 is provided with a gear 127. This gear is rotated by a rack 128 slidably mounted in a subhousing 129 mounted on the valve body 125. The rack has a bore therein in which a helical anti-friction member raceway is cut. A rod 130 is provided with a helical raceway 131 complemental to the raceway in the rack 128. The rod 130 is rotatably mounted in the subhousing 129 and a handwheel 132 is secured to the rod for rotating same. Suitable means are provided for holding the anti-friction members within the confines of the rack. Rotation of the rod will axially move the rack therealong which action will rotate the gear 127 and the shaft 126 on the plug in the valve body. The anti-friction members reduce the effort required in opening and closing the valve. Braking means may be applied to the rod 130 if it is desired.

Vents 70 and ports 55 prevent pressure fluid from the pipe line entering the anti-friction member housings or sleeves.

That which is regarded new, novel and useful and which is sought to be protected by Letters Patent of the United States is as follows:

1. A valve operator for a movable stem comprising a rod having a helical anti-friction ball raceway formed thereon, sealing means around said rod, a nut having an anti-friction ball raceway formed therein complemental to the raceway on the rod, a sleeve secured around said nut and rotatably supporting said nut on said rod, means for rotating said sleeve, a series of antifriction balls disposed between the raceways, and a tubular lubricant-retaining shield around said rod having one end journaled in said sleeve and the other end secured to said sealing means.

2. A valve operator for a movable stem comprising a yoke, a sleeve rotatably supported in said yoke, a nut secured in said sleeve and having a helical raceway, a rod connected to said stem and having a helical raceway complemental to the raceway in said nut, a plurality of balls disposed between said raceways, means for rotating said sleeve, and brake means disposed between the yoke and sleeve for frictionally resisting rotation of said sleeve.

3. A valve operator for a movable stem comprising a yoke, a sleeve rotatably supported in said yoke, a nut secured in said sleeve and having a helical raceway, a rod connected to said stem and having a helical raceway complemental to the raceway in said nut, a plurality of balls disposed between said raceways, means for rotating said sleeve, a tubular shield around said rod having one end extending within said sleeve and the other end closed to retain lubricant around the rod, and brake means disposed between the yoke and sleeve for frictionally resisting rotation of said sleeve.

4. A valve operator for a movable stem comprising a yoke, a sleeve rotatably supported in said yoke, a nut secured in said sleeve and having a helical raceway, a rod connected to said stem and having a helical raceway complemental to the raceway in said nut, a plurality of balls disposed between said raceways, means for rotating said sleeve, a tubular lubricant-retaining shield around said rod having one end journaled in said sleeve and the other end secured to said sealing means, and brake means disposed between the yoke and sleeve for frictionally resisting rotation of said sleeve.

References Cited in the file of this patent

UNITED STATES PATENTS

| Number | Name | Date |
|---|---|---|
| 111,923 | Findlay | Feb. 21, 1871 |
| 610,044 | Glenn | Aug. 30, 1898 |
| 868,025 | Smith | Oct. 15, 1907 |
| 1,071,462 | Regas et al. | Aug. 26, 1913 |
| 1,347,006 | Boas | July 20, 1920 |
| 1,565,805 | Jones | Dec. 12, 1925 |
| 1,749,310 | Belcher | Mar. 4, 1930 |
| 1,885,970 | Westling | Nov. 1, 1932 |
| 2,076,180 | Griswold | Apr. 16, 1937 |
| 2,151,094 | Fiorentino | Mar. 21, 1939 |
| 2,197,155 | Nardone | Apr. 16, 1940 |
| 2,267,524 | Hawkins | Dec. 23, 1941 |
| 2,383,901 | Werner | Aug. 28, 1945 |
| 2,455,368 | Hoffar | Dec. 7, 1948 |